United States Patent
Mondal et al.

(10) Patent No.: US 12,047,218 B2
(45) Date of Patent: Jul. 23, 2024

(54) PHYSICAL DOWNLINK CONTROL CHANNEL MONITORING AND RATE MATCHING FOR REMAINING MINIMUM SYSTEM INFORMATION IN NEW RADIO UNLICENSED

(71) Applicant: Apple Inc., Cupertino, CA (US)

(72) Inventors: Bishwarup Mondal, San Ramon, CA (US); Debdeep Chatterjee, Portland, OR (US); Yongjun Kwak, Nizhny Novgorod (RU); Dae Won Lee, Portland, OR (US); Avik Sengupta, Cupertino, CA (US)

(73) Assignee: Apple Inc., Cupertino, CA (US)

(*) Notice: Subject to any disclaimer, the term of this patent is extended or adjusted under 35 U.S.C. 154(b) by 289 days.

(21) Appl. No.: 17/435,730

(22) PCT Filed: Mar. 27, 2020

(86) PCT No.: PCT/US2020/025379
§ 371 (c)(1),
(2) Date: Sep. 2, 2021

(87) PCT Pub. No.: WO2020/205582
PCT Pub. Date: Oct. 8, 2020

(65) Prior Publication Data
US 2022/0141075 A1    May 5, 2022

Related U.S. Application Data

(60) Provisional application No. 62/826,796, filed on Mar. 29, 2019.

(51) Int. Cl.
*H04L 27/26* (2006.01)
*H04L 1/00* (2006.01)
*H04W 56/00* (2009.01)

(52) U.S. Cl.
CPC ........ *H04L 27/2675* (2013.01); *H04L 1/0013* (2013.01); *H04W 56/0015* (2013.01)

(58) Field of Classification Search
CPC ............ H04L 27/2675; H04L 1/0013; H04W 56/0015; H04B 7/0695
See application file for complete search history.

(56) References Cited

U.S. PATENT DOCUMENTS

2019/0068348 A1\* 2/2019 Nam ..................... H04L 5/0053

FOREIGN PATENT DOCUMENTS

| CN | 109451799 A | 3/2019 | |
| WO | WO-2019051417 A1 \* | 3/2019 | ........... H04L 1/0045 |
| WO | WO-2020183613 A1 \* | 9/2020 | ........... H04L 5/0048 |

OTHER PUBLICATIONS

Initial Access signals and channels for NR-U (Year: 2019).\*
(Continued)

*Primary Examiner* — Ayanah S George
(74) *Attorney, Agent, or Firm* — Eschweiler & Potashnik, LLC

(57) ABSTRACT

Systems, methods, and circuitries are provided for maximizing use of discovery reference (DRS) resources for remaining minimum system information (RMSI) allocation. An example method includes configuring Type 0 physical downlink control channel (PDCCH) CORESET monitoring to include monitoring in either a first slot or a first slot and a second slot; generating a synchronization signal block (SSB) encoding the configured PDCCH CORESET monitoring; and transmitting the SSB to a user equipment (UE) by way of a discovery reference signal (DRS).

20 Claims, 7 Drawing Sheets

(56) References Cited

OTHER PUBLICATIONS

PCT Search Report dated Jul. 10, 2020 in connection with PCT Application No. PCT/US2020/025379.
PCT Written Opinion dated Jul. 10, 2020 in connection with PCT Application No. PCT/US2020/025379.
Ericsson: "Initial access signals and channels for NR-U", 3GPP Draft; R1-1902880; vol. Ran WG1; Feb. 16, 2019; URL:http://www.3gpp.org/ftp/tsg%5Fran/WG1%5FRL1/TSGR1%5F96/Docs/R1%2D1902880%2Ezip.
International Preliminary Report on Patentability dated Sep. 28, 2021 in connection with PCT Application No. PCT/US2020/025379.

* cited by examiner

Q=4, RMSI can span 5 symbols

Q=4, but gNB transmitting 2 beams only,
RMSI can span 12 symbols

Type B RMSI rate-matched around associated SSB

Type B RMSI not rate-matched around associated SSB

PHYSICAL DOWNLINK CONTROL CHANNEL MONITORING AND RATE MATCHING FOR REMAINING MINIMUM SYSTEM INFORMATION IN NEW RADIO UNLICENSED

CROSS REFERENCE TO RELATED APPLICATIONS

This application is a National Phase entry application of International Patent Application No. PCT/US2020/025379 filed Mar. 27, 2020, which claims priority to U.S. Provisional Patent Application No. 62/826,796 filed on Mar. 29, 2019, entitled "PDCCH MONITORING AND RATE-MATCHING FOR RMSI IN NR-U," which is incorporated herein by reference for all purposes.

BACKGROUND

In New Radio-Unlicensed (NR-U) systems, discover reference signal (DRS) transmissions include synchronization signal blocks (SSBs) and remaining minimum system information (RMSI) for each beam.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

The present disclosure is described with reference to the attached figures. The figures are not drawn to scale and they are provided merely to illustrate the disclosure. Several aspects of the disclosure are described below with reference to example applications/use cases for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Figure 1:
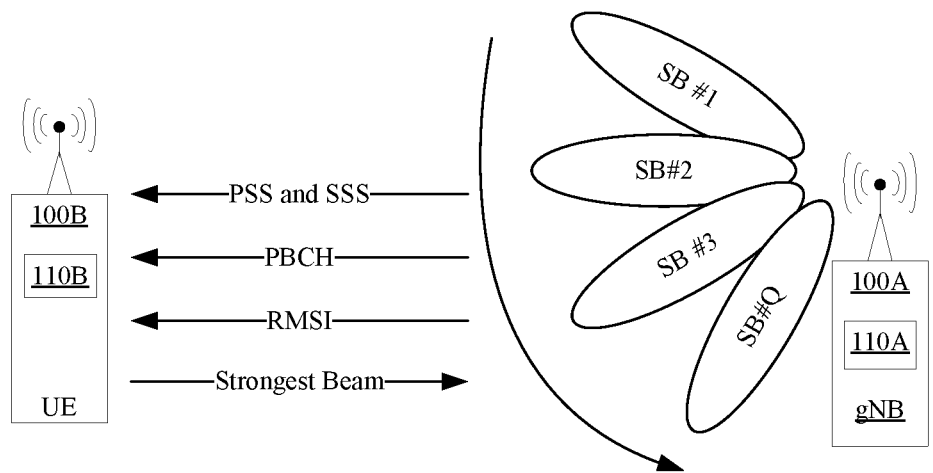
FIG. 1 is a block diagram illustrating an example wireless communication network, according to various aspects disclosed.
Figure 1A:
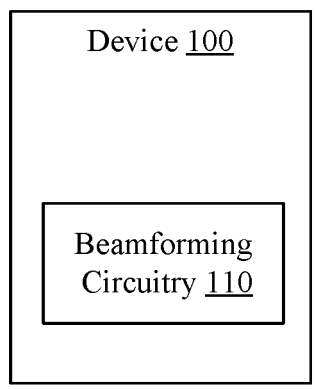
FIG. 1A is a block diagram illustrating an example wireless communication device configured to configure beamformed communication using discovery resource signals, according to various aspects disclosed.
Figure 8:
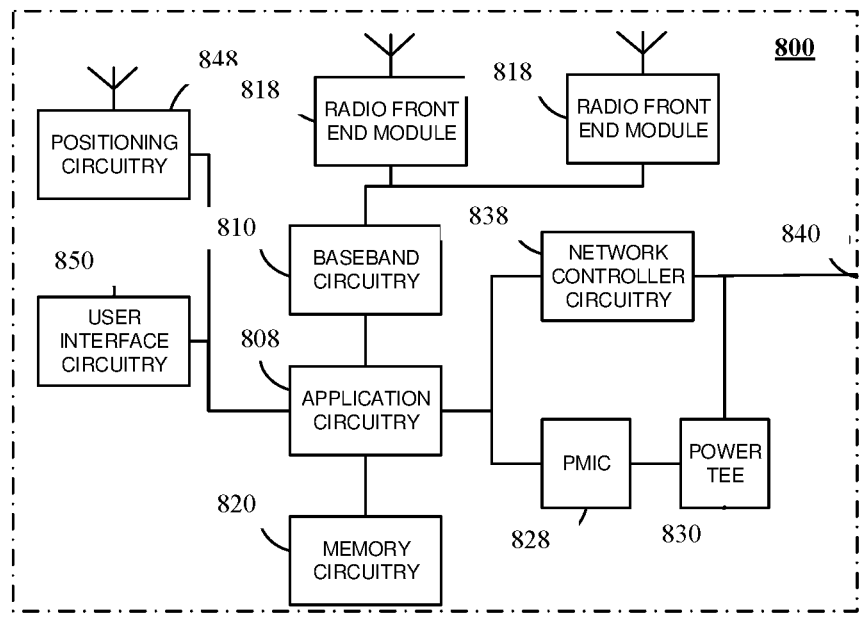
FIG. 8 illustrates an example of an infrastructure equipment device (e.g., NW or eNB), in accordance with various aspects disclosed.
Figure 9:
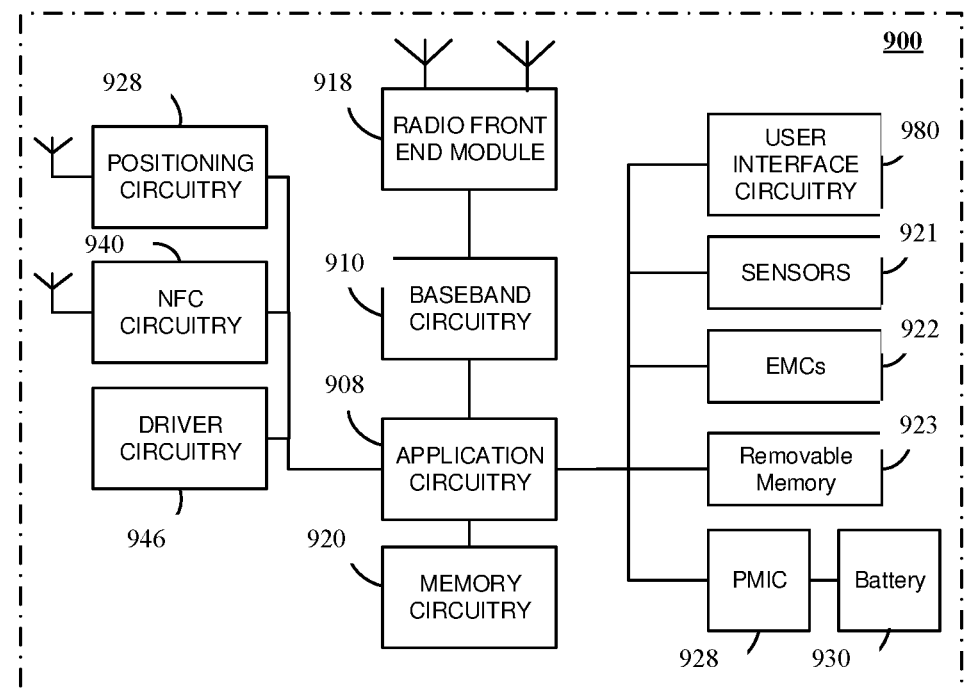
FIG. 9 illustrates an example of a user equipment device (e.g., UE), in accordance with various aspects disclosed.

FIG. 1 illustrates a wireless network that includes a network (NW) node (e.g., Next Generation NodeB (gNB)) 100A and a user equipment device 100B. An example wireless communication network is described in more detail with reference to FIG. 7 in which the NW node 100A is illustrated as a RAN node 711 and UE 100B is illustrated as UE 700. As shown in FIG. 1A, the wireless communication devices 100A and 100B include beamforming circuitry 110 (e.g., a baseband processor or one or more processors) that is configured to cause the device to established a beamformed communication link with the other wireless device. In the following description, when a device 100 is described as performing some function, it is to be understood that the beamforming circuitry 110 is causing the device to perform the function. In one example, the beamforming circuitry 110 includes a processor (e.g., a baseband processor) executing stored instructions to transmit/receive information describing a beam or other channel parameters that will be used in communication (e.g., SSBs, DCI, PDCCH, RMSI, and so on). An example NW node device is illustrated in FIG. 8 and an example UE device is illustrated in FIG. 9.

In order to allow the UE 100B to establish communication the NW node 100A, the NW node (also referred to as the "cell") discovery reference signals (DRS) that encode information that can be used by the UE to select a beamformed link or channel for connection with the NW node. Each SSB includes primary synchronization signals (PSS), secondary synchronization signals (SSS) and physical broadcast channel (PBCH) that includes a master information block (MIB). The DRS are transmitted with a high priority (e.g., using Cat-LBT in unlicensed spectrum). The DRS includes an SSB transmitted using each beam, meaning that the DRS resources are divided amongst the beams as will be described with reference to FIGS. 2-4.

The UE performs a cell search procedure to acquire time and frequency synchronization with a new NW node when a UE enters the cell covered by a NW node. The cell search procedure includes scanning through frequencies until detecting PSS/SSS. After detecting PSS/SSS, the UE decodes PBCH, which includes a master information block (MIB) that describes the location of demodulation reference signals (DMRS) for a particular beam. The UE then decodes remaining minimum system information (RMSI) which includes secondary information block (SIB1). The UE measures the signal strength of the DMRS for each received SSB (e.g., beam) and identifies the SSB with the strongest signal strength. The UE then identifies the beam with the strongest signal to the NW node so that communication using this beam can be established.

Described herein are systems, methods, and circuitries for maximizing DRS resources available for RMSI when multiple beams are in use. In Rel-15 NR, Type-0 PDCCH monitoring occurs over 2 consecutive slots for all cases. In NR-U, DRS duration is limited to 1 ms and transmission for cell-defining carriers occur with 30 kHz SCS (with Cat-2 LBT) which makes RMSI transmission challenging over 2 consecutive slots when the number of beams employed by the cell (total Q beams) is more than 1

To maximize available DRS resources for transmitting RMSI, Type-0 PDCCH monitoring is made configurable between 1 and 2 consecutive slots where the first slot coincides with the slot containing the associated SSB. The configuration is controlled by pdcch-ConfigSIB1. This allows for flexibility of RMSI transmission depending on the number of beams Q used by the NW and the RMSI coverage desired.

Figure 2A:
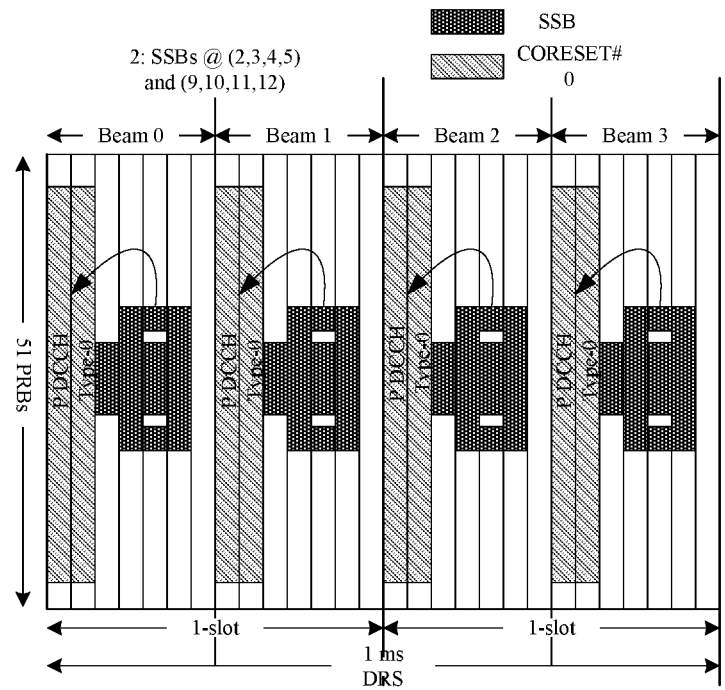
FIGS. 2A and 2B are resource grids illustrating examples of Type 0 physical downlink control channel PDCCH monitoring in a same slot as an SSB, according to various aspects disclosed.
Figure 2B:
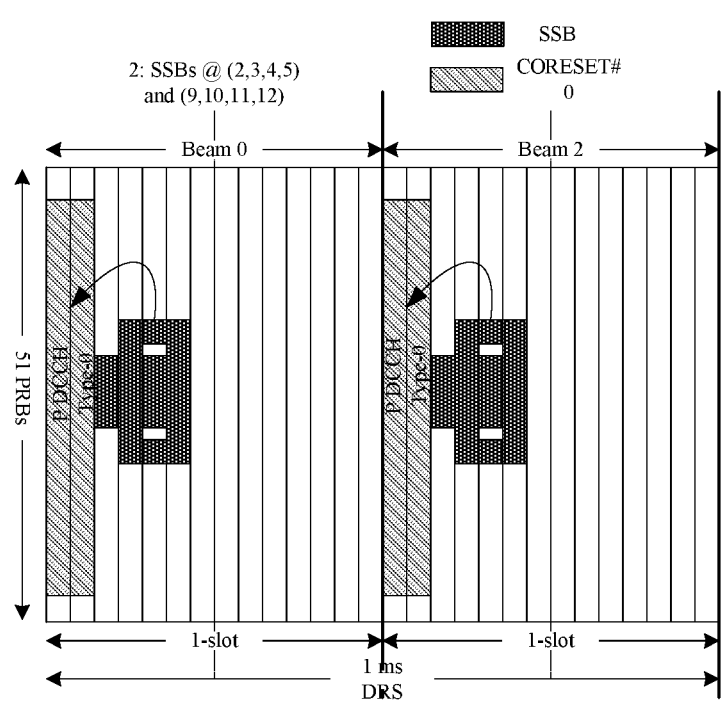

In Rel-15, the general philosophy for RAN2 has been to provide a large SIB1 size to enable lower latency for cell access. In Rel-15, CORESET #0 is monitored in 2 slots. This means that when Q=4 in NR-U the CORESET #0 is going to be monitored in just 0.5 slot. FIGS. 2A and 2B are resource grids illustrating example DRS for when the number of beams employed by the cell is four. In FIG. 2A the NW node is transmitting 4 beams while in FIG. 2B the NW node is transmitting only two beams. DRS transmission is limited to 2 slots (at 30 kHz SCS) that is split into 2 (FIG. 2B), 3 or possibly 4 (FIG. 2A) beams. In FIG. 2A, it can be seen that there is an SSB every half slot that identifies a PDCCH monitoring occasion in the same half slot. This leaves only 5 symbols for the RMSI. In FIG. 2B, it can be seen that when the NW node is transmitting two beams only (Beam 0 and Beam 2), the RMSI can span 12 symbols.

Figure 3A:
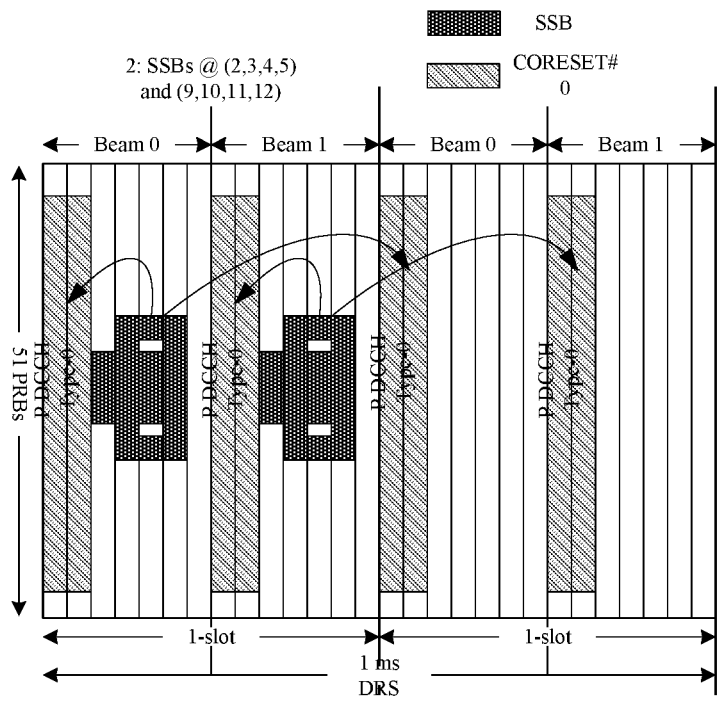
FIGS. 3A and 3B are resource grids illustrating examples of Type 0 physical downlink control channel PDCCH monitoring in a same slot as an SSB and a consecutive slot, according to various aspects disclosed.
Figure 3B:
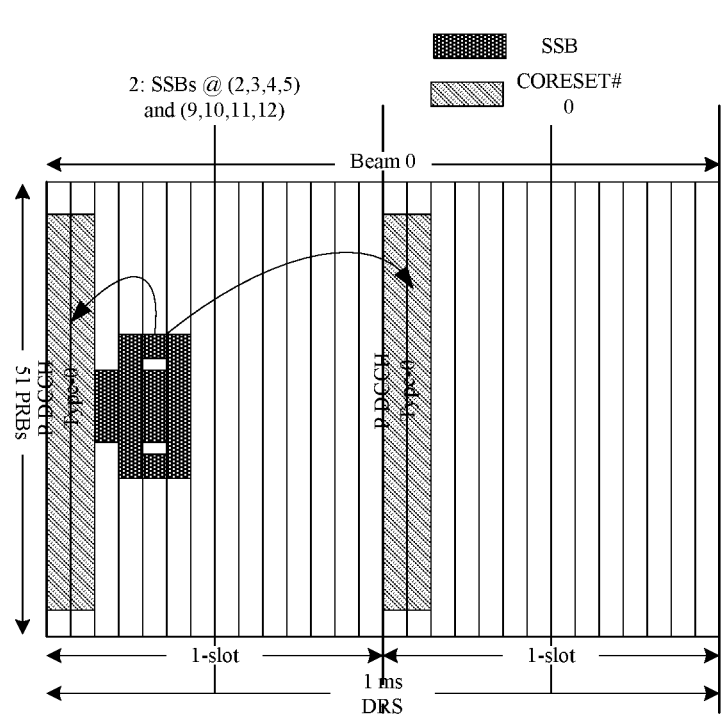

FIGS. 3A and BB are resource grids illustrating example DRS when PDCCH monitoring occurs in two consecutive slots. In FIG. 3A the cell is employing 2 beams while in FIG. 3B the cell is employing only one beam. In FIG. 3A, it can be seen that there is an SSB every half slot that identifies a PDCCH monitoring occasion in the same half slot and the next slot. This leaves 5 symbols for the RMSI in the first half slot. In FIG. 3B, it can be seen that there is an SSB every other half slot that identifies a PDCCH monitoring occasion in the same half slot and the next slot. This leaves 12 symbols for the RMSI in the first slot.

Type-0 PDCCH monitoring positions are provided within a slot in symbols 0 and 7. The PDCCH monitoring is configurable with 1 slot (same as the SSB) or 2 slots (same slot as SSB and consecutive slot). One way to make such an optional configuration follows in Table 1

TABLE 1

| Index in pdcch-ConfigSIB1 | PDCCH monitoring occasion and slot number | First symbol index | Comments |
|---|---|---|---|
| 0 | $SFN_c = SFN_{SSB,i}$, $n_c = n_{SSB,i}$, only | {0 if i is even}, {7 if i is odd} | monitoring 1 slot (same slot as SSB) |
| 1 | $SFN_c = SFN_{SSB,i}$, $n_c = n_{SSB,i}$, $n_c = n_{SSB,i} + 1$ | {0 if i is even}, {7 if i is odd} | monitoring 2 consecutive slots (same slot as SSB and the next slot) |

Figure 4A:
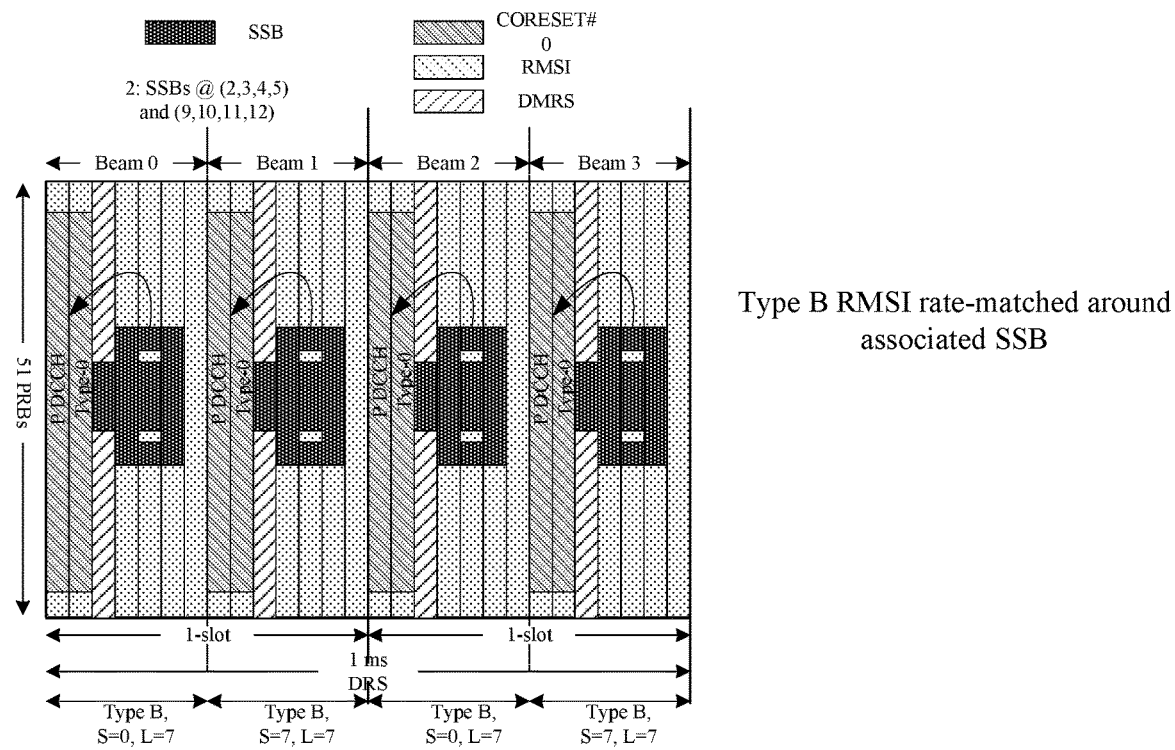
FIGS. 4A and 4B are resource grids illustrating examples of Type B RMSI rate matching, according to various aspects disclosed.
Figure 4B:
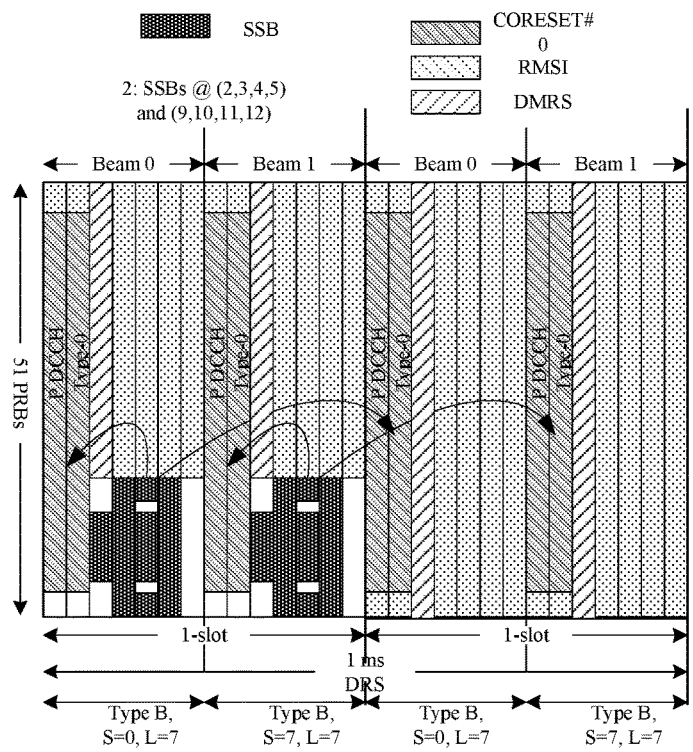

Another way to maximize use of DRS resources is to allow PDSCH (RMSI) Type B (DMRS specified relative to starting symbol) time domain resource allocation starting with symbols 0 and 7. By doing so, the half slot available for RMSI transmission can be fully utilized while keeping the Type B resource allocation length to 7 symbols per the Rel-15 requirement. Referring to FIGS. 4A and 4B, to accommodate this allocation, the DMRS is shifted to the first symbol after the CORESET depending on the number of symbols in the CORESET. Or the associated DMRS can always be positioned in symbol 2 or symbol 9, assuming that the maximum number of symbols for PDCCH Type 0 CORESET is 2.

To allow for PDSCH (RMSI) Type B time domain resource allocation starting with symbols 0 and 7, it can be specified that RMSI PDSCH with type B resource allocation is rate-matched around the CORESET indicated by the MIB or around the two symbols in which the CORESET indicated by MIB is to be monitored for RMSI PDSCH scheduling. FIG. 4A illustrates the case in which the Type B RMSI is rate-matched around the associated SSB. FIG. 4B illustrates the case in which the Type B RMSI is not rate-matched around the associated SSB. In other words, although the PDSCH starting symbol is symbol number 0 or 7, the PDSCH symbols are rate-matched and mapped to resource elements corresponding to symbol number 2 and 9, respectively.

Accordingly a default time-domain resource allocation table can be modified to the following Table 2 where Type B PDSCH starting at symbols 0 and 7 and of length 7 are introduced as shown in FIGS. 4A and 4B.

TABLE 2

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 → 7 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 → 0 | 7 |
| 16 | 2, 3 | Type B | 0 | 8 | 4 |

Figure 5:
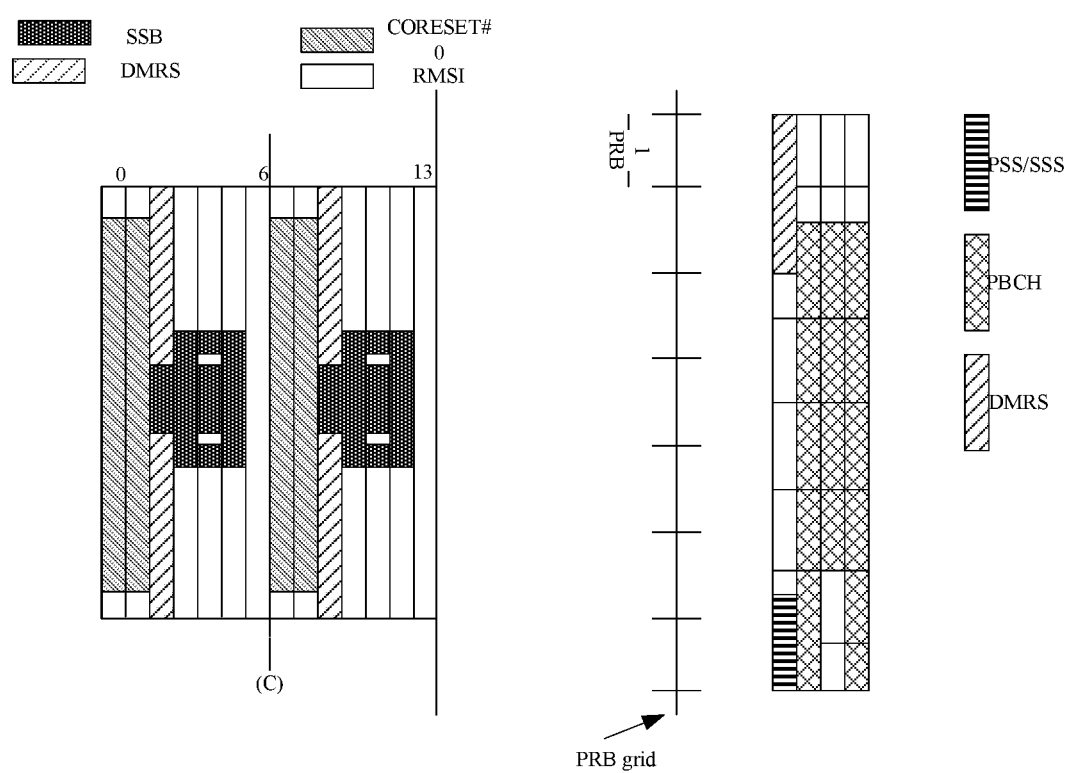
FIG. 5 is a resource grid illustrating an examples of demodulation reference signal transmitted on a primary synchronization signal symbol within the SSB boundary, according to various aspects disclosed.

RMSI PDSCH rate matching around the SSB can be performed without significant impact to channel estimation as shown in FIG. 5. It can be seen that the physical resource block (PRB) grid for PDSCH is not aligned with the SSB boundary. Accordingly there is fraction of a PRB that is available for PDSCH reception at the edge of the SSB. In this fractional PRB, due to the structure of the SSB, it is still possible to have DMRS transmission (for PDSCH) covering the full PRB as shown in FIG. 5 that reduces impact to channel estimation at the UE. The PDSCH spans only a fraction of subcarriers on this fractional PRB.

Following are one or more flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein the term generate, when used with reference to a signal, should be construed broadly as encompassing any manner of calculating, computing, selecting from amongst stored signal options, or otherwise determining a signal using a processor and processing the signal for communication to another device.

Figure 6:
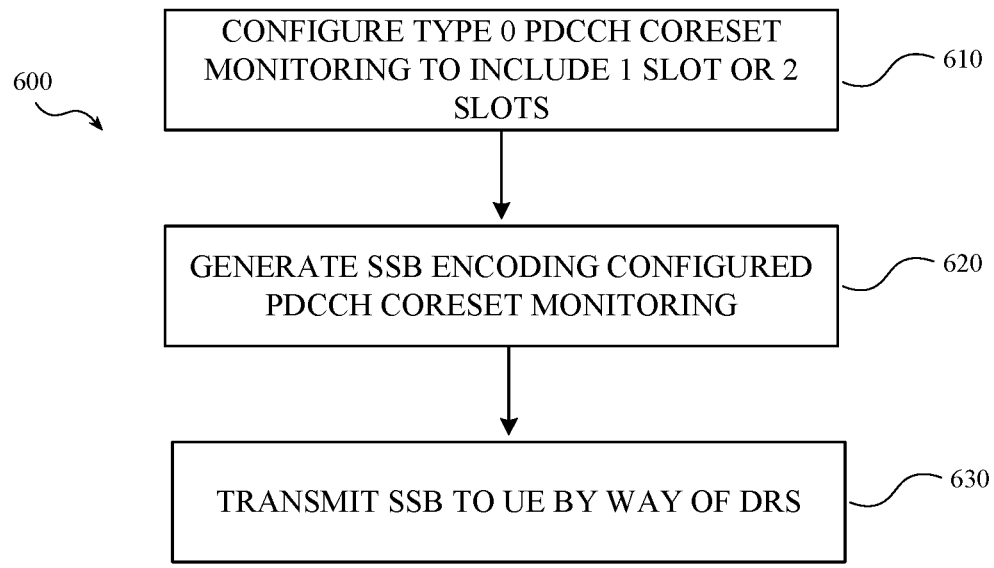
FIG. 6 is a flow diagram illustrating an example method for configuring and signaling beamforming information, according to various aspects disclosed.

FIG. 6 depicts a flow diagram outlining a method 600, for a device serving as a network (NW) node in a wireless network. The method includes, at 610, configuring Type 0 physical downlink control channel (PDCCH) CORESET monitoring to include monitoring in either a first slot or a first slot and a second slot. At 620, a synchronization signal block (SSB) is generating that encodes the configured PDCCH CORESET monitoring. The SSB is transmitted to a user equipment (UE) by way of a discovery reference signal (DRS) at 630.

Figure 7:
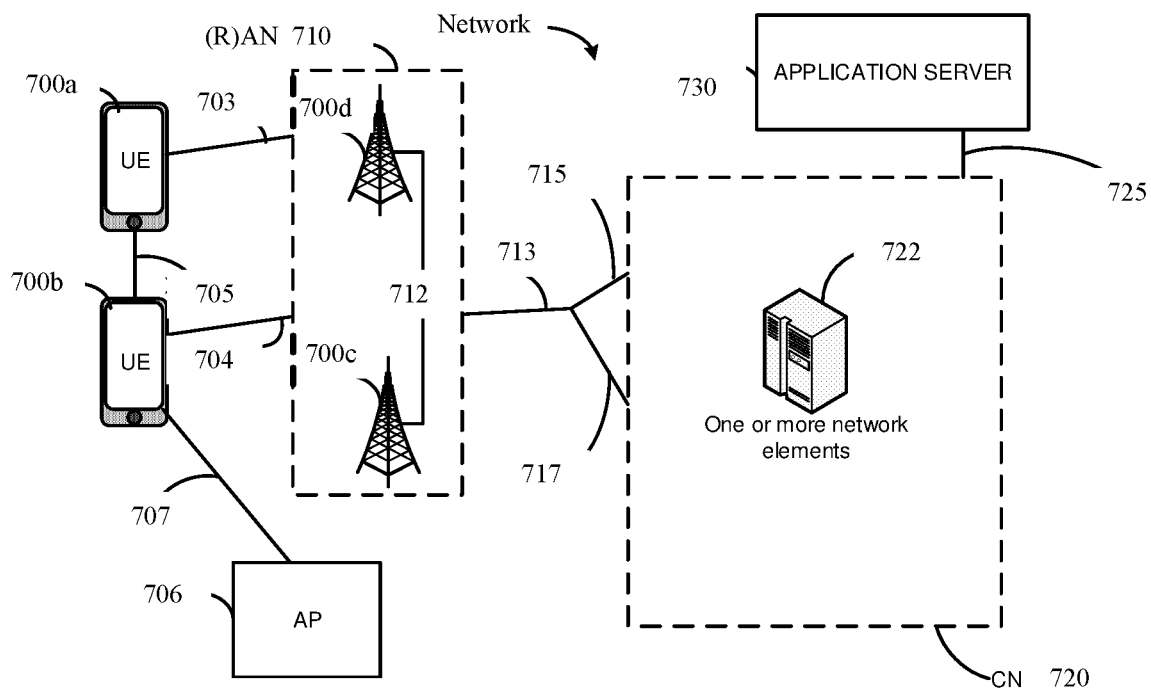
FIG. 7 illustrates an example communication network, in accordance with various aspects disclosed.

FIG. 7 illustrates an example architecture of a communication network, in accordance with various embodiments. The following description is provided for an example network that operates in conjunction with the LTE system standards and 8G or NR system standards as provided by 6GPP technical specifications. However, the example embodiments are not limited in this regard and the described embodiments may apply to other networks that benefit from the principles described herein, such as future 6GPP systems (e.g., Sixth Generation (6G)) systems, IEEE 802.16 protocols (e.g., WMAN, WiMAX, etc.), or the like.

As shown by FIG. 7, the network includes UE 700a and UE 700b (collectively referred to as "UEs 700" or "UE 700"). In this example, UEs 700 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 700 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 700 may be configured to connect, for example, communicatively couple, with a RAN 710. In embodiments, the RAN 710 may be an NG RAN or a 8G RAN, an E-UTRAN, or a legacy RAN, such as a UTRAN or GERAN. As used herein, the term "NG RAN" or the like may refer to a RAN 710 that operates in an NR or 8G system 700, and the term "E-UTRAN" or the like may refer to a RAN 710 that operates in an LTE or 7G system 700. The UEs 700 utilize connections (or channels) 703 and 704, respectively, each of which comprises a physical communications interface or layer (discussed in further detail below).

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 6GPP LTE protocol, a 8G protocol, a NR protocol, and/or any of the other communications protocols discussed herein. In embodiments, the UEs 700 may directly exchange communication data via a ProSe interface 705. The ProSe interface 705 may alternatively be referred to as a SL interface 705 and may comprise one or more logical channels, including but not limited to a PSCCH, a PSSCH, a PSDCH, and a PSBCH.

The UE 700b is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 700b, RAN 710, and AP 706 may be configured to utilize LWA operation and/or LWIP operation. The LWA operation may involve the UE 700b in RRC_CONNECTED being configured by a RAN node 711a-b to utilize radio resources of LTE and WLAN. LWIP operation may involve the UE 700b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 8G system 700 (for example, a NW node), and the term "E-UTRAN node" or the like may refer to a RAN node 711 that operates in an LTE or 7G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, a downlink resource grid can be used for downlink transmissions from any of the RAN nodes 711 to the UEs 700, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 700 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 700 MHz to approximately 6.8 GHz, whereas the unlicensed spectrum may include the 8 GHz band.

To operate in the unlicensed spectrum, the UEs 700 and the RAN nodes 711 may operate using LAA, eLAA, and/or feLAA mechanisms. In these implementations, the UEs 700 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 700, RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 8 GHz band are WLANs based on IEEE 802.11 technologies. WLAN employs a contention-based channel access mechanism, called CSMA/CA. Here, when a WLAN node (e.g., a mobile station (MS) such as UE 700, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MOOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 6, 8, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different path losses. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 700 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 700. The PDCCH carries information about the transport format and resource allocations related to the PDSCH channel, among other things. It may also inform the UEs 700 about the transport format, resource allocation, and HARQ information related to the uplink shared channel. Typically, downlink scheduling (assigning control and shared channel resource blocks to the UE 700*b* within a cell) may be performed at any of the RAN nodes 711 based on channel quality information fed back from any of the UEs 700. The downlink resource assignment information may be sent on the PDCCH used for (e.g., assigned to) each of the UEs 700.

The RAN 710 is shown to be communicatively coupled to a core network—in this embodiment, core network (CN) 720. The CN 720 may comprise a plurality of network elements 722, which are configured to offer various data and telecommunications services to customers/subscribers (e.g., users of UEs 700) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

FIG. 8 illustrates an example of infrastructure equipment device 800 in accordance with various embodiments. The infrastructure equipment device 800 (or "device 800") may be implemented as a base station, radio head, RAN node such as the RAN nodes 711 and/or AP 706 shown and described previously, application server(s) 730, and/or any other element/device discussed herein. In other examples, the device 800 could be implemented in or by a UE. The device 800 may be configured to transmit DRS for beamforming configuration.

The system 800 includes application circuitry 805, baseband circuitry 810 (e.g., CSI/DRS circuitry 110 of FIG. 1A), one or more radio front end modules (RFEMs) 815, memory circuitry 820, power management integrated circuitry (PMIC) 825, power tee circuitry 830, network controller circuitry 835, network interface connector 840, satellite positioning circuitry 845, and user interface circuitry 850. In some embodiments, the device 800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 805 includes circuitry such as, but not limited to one or more processors (or processor cores), cache memory, and one or more of low drop-out voltage regulators (LDOs), interrupt controllers, serial interfaces such as SPI, 120 or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 805 may comprise, or may be, a special-purpose processor/controller to operate according to the various embodiments herein. As examples, the processor(s) of application circuitry 805 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 800 may not utilize application circuitry 805, and instead may include a special-purpose processor/controller to process IP data received from an EPC or 8GC, for example.

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 8 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

FIG. 9 illustrates an example of a device 900 in accordance with various embodiments. In embodiments, the device 900 may be suitable for use as UE 100A of FIG. 1, UE 700 of FIG. 7, and/or any other element/device discussed herein. The device 900 may include any combinations of the components shown in the example. The components of device 900 may be implemented as integrated circuits (ICs), portions thereof, discrete electronic devices, or other modules, logic, hardware, software, firmware, or a combination thereof adapted in the device 900, or as components otherwise incorporated within a chassis of a larger system. The block diagram of FIG. 9 is intended to show a high level view of components of the device 900. However, some of the components shown may be omitted, additional components may be present, and different arrangement of the components shown may occur in other implementations.

Application circuitry 905 includes circuitry such as, but not limited to one or more processors (or processor cores), cache memory, and one or more of LDOs, interrupt controllers, serial interfaces such as SPI, 120 or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 905 may be coupled with or may include memory/storage elements and may be configured to execute instructions stored in the memory/storage to enable various applications or operating systems to run on the device 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 905 may include a general or special purpose processor, such as an A-series processor (e.g., the A13 Bionic), available from Apple® Inc., Cupertino, CA or any other such processor. The processors of the application circuitry 905 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 905 may be a part of a system on a chip (SoC) in which the application circuitry 905 and other components are formed into a single integrated circuit, or a single package.

The baseband circuitry 910 (e.g., CSI/DRS circuitry 110 of FIG. 1A) may be implemented, for example, as a solder-down substrate including one or more integrated circuits, a single packaged integrated circuit soldered to a main circuit board or a multi-chip module containing two or more integrated circuits.

The device 900 may also include interface circuitry (not shown) that is used to connect external devices with the device 900. The external devices connected to the device 900 via the interface circuitry include sensor circuitry 921 and electro-mechanical components (EMCs) 922, as well as removable memory devices coupled to removable memory circuitry 923.

A battery 930 may power the platform 900, although in some examples the device 900 may be mounted deployed in a fixed location, and may have a power supply coupled to an electrical grid. The battery 930 may be a lithium ion battery, a metal-air battery, such as a zinc-air battery, an aluminum-air battery, a lithium-air battery, and the like. In some implementations, such as in V2X applications, the battery 930 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is an apparatus for a wireless communication device (device) serving as a network (NW) node in a wireless network, including one or more processors configured to cause the device to: configure Type 0 physical downlink control channel (PDCCH) CORESET monitoring to include monitoring in either a first slot or a first slot and a second slot; generate a synchronization signal block (SSB) encoding the configured PDCCH CORESET monitoring; and transmit the SSB to a user equipment (UE) by way of a discovery reference signal (DRS).

Example 2 includes the subject matter of example 1, including or omitting optional elements, wherein the first slot includes a same slot as the SSB.

Example 3 includes the subject matter of example 1, including or omitting optional elements, wherein the second slot is consecutive with the first slot.

Example 4 includes the subject matter of example 1, including or omitting optional elements, wherein the one or more processors are configured to cause the device to select a first index value for parameter pdcch-ConfigSIB1 corresponding to PDCCH CORESET monitoring in the first slot.

Example 5 includes the subject matter of example 4, including or omitting optional elements, wherein the one or more processors are configured to cause the device to select a second index value for parameter pdcch-ConfigSIB1 corresponding to PDCCH CORESET monitoring in the first slot and the second slot.

Example 6 includes the subject matter of example 1, including or omitting optional elements, wherein the one or more processors are configured to cause the device to allocate resources for demodulation reference signals (DMRS) in a symbol immediately subsequent the PDCCH CORESET in the DRS.

Example 7 includes the subject matter of any one of examples 1-6, including or omitting optional elements, wherein the one or more processors are configured to cause the device to allocate resources for the DMRS in symbol 2 or symbol 9 in the DRS.

Example 8 includes the subject matter of any one of examples 1-6, including or omitting optional elements, wherein the one or more processors are configured to cause the device to allocate physical downlink shared channel (PDSCH) resources for carrying remaining minimum system information (RMSI) starting at symbol 0 with length 7.

Example 9 includes the subject matter of example 8, including or omitting optional elements, wherein the one or more processors are configured to cause the device to allocate the PDSCH resources for carrying the RMSI starting at symbol 7 with length 7.

Example 10 includes the subject matter of any one of examples 1-6, including or omitting optional elements, wherein the one or more processors are configured to cause the device to rate match the PDSCH resources carrying the RMSI around the SSB.

Example 11 includes the subject matter of any one of examples 1-6, including or omitting optional elements, wherein the one or more processors are configured to cause the device to rate match the PDSCH resources carrying the RMSI around the PDCCH CORESET.

Example 122 includes the subject matter of any one of examples 1-6, including or omitting optional elements, wherein the one or more processors are configured to cause the device to rate match PDSCH scheduled by SI-RNTI or P-RNTI in PDCCH search space Type 0 common, Type 0A common, or Type 2 common and associated with CORESET #0 I around the PDCCH CORESET.

Example 13 includes the subject matter of any one of examples 1-6, including or omitting optional elements, wherein the one or more processors are configured to cause the device to rate match the PDSCH resources carrying the RMSI around two symbols monitored for the PDCCH CORESET.

Example 14 includes the subject matter of any one of examples 1-6, including or omitting optional elements, wherein the one or more processors are configured to cause the device to rate match physical downlink shared channel (PDSCH) resources having a starting symbol of 0 with resource elements in symbol 2 and rate match physical downlink shared channel (PDSCH) resources having a starting symbol of 7 with resource elements in symbol 9.

Example 15 is a method, including with a wireless communication device (device) serving as a network (NW) node in a wireless network: configuring Type 0 physical downlink control channel (PDCCH) CORESET monitoring to include monitoring in either a first slot or a first slot and a second slot; generating a synchronization signal block (SSB) encoding the configured PDCCH CORESET monitoring; and transmitting the SSB to a user equipment (UE) by way of a discovery reference signal (DRS).

Example 16 includes the subject matter of example 15, including or omitting optional elements, wherein the first slot includes a same slot as the SSB.

Example 17 includes the subject matter of example 15, including or omitting optional elements, wherein the second slot is consecutive with the first slot.

Example 18 includes the subject matter of example 15, including or omitting optional elements, including selecting a first index value for parameter pdcch-ConfigSIB1 corresponding to PDCCH CORESET monitoring in the first slot.

Example 19 includes the subject matter of example 18, including or omitting optional elements, including selecting a second index value for parameter pdcch-ConfigSIB1 corresponding to PDCCH CORESET monitoring in the first slot and the second slot.

Example 20 includes the subject matter of any one of examples 15-19, including or omitting optional elements, including allocating resources for demodulation reference signals (DMRS) in a symbol immediately subsequent the PDCCH CORESET in the DRS.

Example 21 includes the subject matter of example 20, including or omitting optional elements, including allocating resources for the DMRS in symbol 2 or symbol 9 in the DRS.

Example 22 includes the subject matter of any one of examples 15-19, including or omitting optional elements, including allocating physical downlink shared channel (PDSCH) resources for carrying remaining minimum system information (RMSI) starting at symbol 0 with length 7.

Example 23 includes the subject matter of example 22, including or omitting optional elements, including allocating the PDSCH resources for carrying the RMSI starting at symbol 7 with length 7.

Example 24 includes the subject matter of any one of examples 15-19, including or omitting optional elements, including rate matching the PDSCH resources carrying the RMSI around the SSB.

Example 25 includes the subject matter of any one of examples 15-19, including or omitting optional elements, including rate matching the PDSCH resources carrying the RMSI around the PDCCH CORESET.

Example 26 includes the subject matter of any one of examples 15-19, including or omitting optional elements, including rate matching PDSCH scheduled by SI-RNTI or P-RNTI in PDCCH search space Type 0 common, Type 0A common, or Type 2 common and associated with CORESET #0 I around the PDCCH CORESET.

Example 27 includes the subject matter of any one of examples 15-19, including or omitting optional elements, including rate matching the PDSCH resources carrying the RMSI around two symbols monitored for the PDCCH CORESET.

Example 28 includes the subject matter of example 18, including or omitting optional elements, including rate matching physical downlink shared channel (PDSCH) resources having a starting symbol of 0 with resource elements in symbol 2; and rate matching physical downlink shared channel (PDSCH) resources having a starting symbol of 7 with resource elements in symbol 9.

Example 29 is an apparatus for a wireless communication device (device) serving as a user equipment (UE) in a wireless network, including one or more processors configured to cause the device to: receive a discovery reference signal (DRS) including Type 0 physical downlink control channel (PDCCH) CORESET monitoring in either a first slot or the first slot and a second slot; and, in response, monitoring the first slot or the first slot and the second slot.

Example 30 includes the subject matter of example 29, including or omitting optional elements, wherein the first slot includes a same slot as the SSB.

Example 31 includes the subject matter of example 29, including or omitting optional elements, wherein the second slot is consecutive with the first slot.

Example 32 includes the subject matter of example 29, including or omitting optional elements, wherein the one or more processors are configured to cause the device to determine to monitor the first slot in response to receiving a first index value for parameter pdcch-ConfigSIB1 corresponding to PDCCH CORESET monitoring in the first slot.

Example 33 includes the subject matter of example 32, including or omitting optional elements, wherein the one or more processors are configured to cause the device to determine to monitor the first slot in response to receiving a second index value for parameter pdcch-ConfigSIB1 corresponding to PDCCH CORESET monitoring in the first slot and the second slot.

Example 34 includes the subject matter of any one of examples 29-33, including or omitting optional elements, wherein the one or more processors are configured to cause the device to determine to monitor resources for demodulation reference signals (DMRS) in a symbol immediately subsequent the PDCCH CORESET in the DRS.

Example 35 includes the subject matter of examples 29-33, including or omitting optional elements, wherein the one or more processors are configured to cause the device to determine to monitor resources for the DMRS in symbol 2 or symbol 9 in the DRS.

Example 36 includes the subject matter of examples 29-33, including or omitting optional elements, wherein the one or more processors are configured to cause the device to determine to monitor physical downlink shared channel (PDSCH) resources for remaining minimum system information (RMSI) starting at symbol 0 with length 7.

Example 37 includes the subject matter of example 36, including or omitting optional elements, wherein the one or more processors are configured to cause the device to allocate the PDSCH resources for the RMSI starting at symbol 7 with length 7.

Example 38 includes the subject matter of examples 29-33, including or omitting optional elements, wherein the one or more processors are configured to cause the device to de-rate match the PDSCH resources carrying the RMSI around the SSB.

Example 39 includes the subject matter of examples 29-33, including or omitting optional elements, wherein the one or more processors are configured to cause the device to de-rate match the PDSCH resources carrying the RMSI around the PDCCH CORESET.

Example A may include the method of Type 0 PDCCH monitoring and RMSI rate-matching comprising of flexible monitoring and flexible rate-matching.

Example B may include the method of example A or some other example herein, where the flexible monitoring comprises of indication using pdcch-ConfigSIB1 of either indicating a first monitoring occasion configuration or a second monitoring occasion configuration.

Example C may include the method of example B or some other example herein, where the first monitoring occasion configuration comprises of monitoring PDCCH in the same slot as the associated SSB Example D may include the method of example B or some other example herein, where the second monitoring occasion configuration comprises of monitoring PDCCH in the same slot as the associated SSB and the next slot.

Example E may include the method of example A or some other example herein, where the flexible rate-matching comprises of CORESET rate-matching and SSB rate-matching Example F may include the method of example E or some other example herein, where CORESET rate-matching comprises of PDSCH scheduled by SI-RNTI or P-RNTI in PDCCH search space Type 0 common, Type 0A common, or Type 2 common and associated with CORESET #0 is rate-matched around the CORESET.

Example G may include a method comprising receiving an indication of a first monitoring occasion configuration or a second monitoring occasion configuration; and monitoring PDCCH based on the received indication.

Example H may include the method of example G or some other example herein wherein the indication is received in a pdcch-ConfigSIB1 information element.

Example I may include the method of example G or some other example herein, where the indication is to indicate the first monitoring occasion configuration, which comprises monitoring PDCCH in a same slot as an associated SSB.

Example J may include the method of example G or some other example herein, where the indication is to indicate the second monitoring occasion configuration, which comprises monitoring PDCCH in a same slot as an associated SSB and a next slot.

Example K may include a method of performing a flexible RMSI rate-matching that comprises: CORESET rate-matching or SSB rate matching.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A user equipment (UE), comprising a memory and one or more processors configured to, when executing instructions stored in the memory, cause the UE to:
    receive a discovery reference signal (DRS) that includes, in a first slot, a synchronization signal block (SSB) configuring a Type 0 physical downlink control channel (PDCCH) CORESET monitoring in the first slot and a second slot of the DRS; and
    in response, monitor the first slot and the second slot of the DRS.

2. The UE of claim 1, wherein the second slot is consecutive with the first slot.

3. The UE of claim 1, wherein the one or more processors are configured to cause the UE to:
    monitor the first slot and not the second slot in response to receiving a first index value for parameter pdcch-ConfigSIB1 corresponding to PDCCH CORESET monitoring in the first slot; or
    monitor the first slot in response to receiving a second index value for parameter pdcch-ConfigSIB1 corresponding to PDCCH CORESET monitoring in the first slot and the second slot.

4. The UE of claim 1, wherein the one or more processors are configured to cause the UE to:
    monitor resources for demodulation reference signals (DMRS) in a symbol immediately subsequent the PDCCH CORESET in the DRS.

5. The UE of claim 4, wherein the one or more processors are configured to cause the UE to:

monitor resources for the DMRS in symbol 2 or symbol 9 in the DRS.

6. The UE of claim 1, wherein the one or more processors are configured to cause the UE to:
determine a TYPE B physical downlink shared channel (PDSCH) mapping listed as a row entry of a default time domain resource allocation table including parameters starting symbol of 0 and length of 7; and
receive remaining minimum system information (RMSI) on PDSCH resources according to the row entry.

7. The UE of claim 6, wherein the one or more processors are configured to cause the UE to:
monitor the PDSCH resources for the RMSI starting at symbol 7 with length 7.

8. The UE of claim 1, wherein the one or more processors are configured to cause the UE to:
de-rate match PDSCH resources carrying RMSI around the SSB.

9. The UE of claim 1, wherein the one or more processors are configured to cause the UE to:
de-rate match PDSCH resources carrying RMSI around the PDCCH CORESET.

10. The UE of claim 1, wherein the one or more processors are configured to cause the UE to:
de-rate match PDSCH resources scheduled by SI-RNTI or P-RNTI in PDCCH search space Type 0 common, Type 0A common, or Type 2 common and associated with CORESET #0 I around the PDCCH CORESET.

11. The UE of claim 1, wherein the one or more processors are configured to cause the UE to:
de-rate match PDSCH resources carrying RMSI around two symbols monitored for the PDCCH CORESET.

12. The UE of claim 1, wherein the one or more processors are configured to cause the UE to:
de-rate match PDSCH resources having a starting symbol of 0 with resource elements in symbol 2; and
de-rate match PDSCH resources having a starting symbol of 7 with resource elements in symbol 9.

13. A network (NW) node in a wireless network, comprising a memory and one or more processors configured to, when executing instructions stored in the memory, cause the NW node to:
configure Type 0 physical downlink control channel (PDCCH) CORESET monitoring to include monitoring in a first slot and a second slot of a discovery reference signal (DRS);
generate a synchronization signal block (SSB) encoding the configured PDCCH CORESET monitoring; and
transmit the DRS including the SSB in the first slot to a user equipment (UE).

14. The NW node of claim 13, wherein the one or more processors are configured to cause the NW node to:
rate match physical downlink shared channel (PDSCH) resources carrying remaining minimum system information (RMSI) around the SSB.

15. The NW node of claim 13, wherein the one or more processors are configured to cause the NW node to:
rate match PDSCH resources carrying RMSI around the PDCCH CORESET.

16. The NW node of claim 13, wherein the one or more processors are configured to cause the NW node to:
rate match PDSCH scheduled by SI-RNTI or P-RNTI in PDCCH search space Type 0 common, Type 0A common, or Type 2 common and associated with CORESET #0 I around the PDCCH CORESET.

17. The NW node of claim 13, wherein the one or more processors are configured to cause the NW node to:
rate match PDSCH resources carrying RMSI around two symbols monitored for the PDCCH CORESET.

18. The NW node of claim 13, wherein the one or more processors are configured to cause the NW node to:
rate match PDSCH resources having a starting symbol of 0 with resource elements in symbol 2; and
rate match PDSCH resources having a starting symbol of 7 with resource elements in symbol 9.

19. A baseband processor, configured to perform operations comprising:
receiving a discovery reference signal (DRS) that includes, in a first slot, a synchronization signal block (SSB) configuring a Type 0 physical downlink control channel (PDCCH) CORESET monitoring in either a first slot of the DRS or the first slot and a second slot of the DRS;
in response, monitoring the first slot of the DRS or the first slot and the second slot of the DRS; and
de-rate match PDSCH resources carrying remaining minimum system information (RMSI) around the PDCCH CORESET.

20. The baseband processor of claim 19, wherein the operations comprise
monitoring the first slot and not the second slot in response to receiving a first index value for parameter pdcch-ConfigSIB1 corresponding to PDCCH CORESET monitoring in the first slot; or
monitoring the first slot in response to receiving a second index value for parameter pdcch-ConfigSIB1 corresponding to PDCCH CORESET monitoring in the first slot and the second slot.

* * * * *